United States Patent
Granade et al.

(10) Patent No.: US 11,067,618 B2
(45) Date of Patent: Jul. 20, 2021

(54) SYSTEMS AND METHODS OF DIAGNOSING ROOT CAUSES OF ANOMALOUS AMI INFORMATION

(71) Applicant: THE SOUTHERN COMPANY, Atlanta, GA (US)

(72) Inventors: Wesley Morgan Granade, Sharpsburg, GA (US); Melanie Steele Sosebee, Forsyth, GA (US); Robert L. Hatcher, Marietta, GA (US); Tracey Lee Miller, Fayetteville, GA (US); Reginald W. Carroll, Suwanee, GA (US)

(73) Assignee: The Southern Company, Atlanta, GA (US)

( * ) Notice: Subject to any disclaimer, the term of this patent is extended or adjusted under 35 U.S.C. 154(b) by 549 days.

(21) Appl. No.: 16/041,135

(22) Filed: Jul. 20, 2018

(65) Prior Publication Data

US 2019/0025365 A1 Jan. 24, 2019

Related U.S. Application Data

(60) Provisional application No. 62/534,853, filed on Jul. 20, 2017.

(51) Int. Cl.
*G01R 31/08* (2020.01)
*G06Q 50/06* (2012.01)
*G06Q 20/14* (2012.01)
*G06Q 20/40* (2012.01)

(52) U.S. Cl.
CPC ......... *G01R 31/088* (2013.01); *G06Q 20/145* (2013.01); *G06Q 20/4016* (2013.01); *G06Q 50/06* (2013.01)

(58) Field of Classification Search
CPC ............... G01R 31/088; G06Q 20/145; G06Q 20/4016; G06Q 50/06
See application file for complete search history.

(56) References Cited

U.S. PATENT DOCUMENTS

| | | | |
|---|---|---|---|
| 2003/0009401 A1* | 1/2003 | Ellis ....................... | G06Q 30/04 705/35 |
| 2012/0036250 A1* | 2/2012 | Vaswani ................ | G01D 4/004 709/224 |
| 2012/0232915 A1* | 9/2012 | Bromberger .......... | G01F 15/063 705/1.1 |
| 2013/0173322 A1* | 7/2013 | Gray ...................... | G06Q 10/06 705/7.13 |
| 2018/0107941 A1* | 4/2018 | Siebel ................... | G06N 20/00 |

\* cited by examiner

*Primary Examiner* — Raymond L Nimox
(74) *Attorney, Agent, or Firm* — Troutman Pepper Hamilton Sanders LLP; Dustin B. Weeks; Micah B. Hensley

(57) ABSTRACT

An example embodiment of the present disclosure provides a method of diagnosing root causes of anomalous AMI meter data. The method can include receiving meter data, identifying anomalous data in the meter data, comparing the anomalous data to a database of known root causes, and generating a work order if there is a known root causes of the anomalous data. The method can also include requesting manual review of anomalous data without a known root cause and receiving input indicating a discovered root cause. The method can add the discovered root cause to the database of known root causes.

15 Claims, 8 Drawing Sheets

SYSTEMS AND METHODS OF DIAGNOSING ROOT CAUSES OF ANOMALOUS AMI INFORMATION

CROSS REFERENCE TO RELATED APPLICATIONS

This application claims benefit, under 35 U.S.C. § 119(e), of U.S. Provisional Application Ser. No. 62/534,853, filed 20 Jul. 2017 of which the entire contents and substance are hereby incorporated by reference as if fully set forth below.

TECHNICAL FIELD

The various embodiments of the present disclosure relate generally to determining a cause of anomalous information garnered from a network of advanced metering infrastructure ("AMI") meters. More particularly, the various embodiments of the present disclosure are directed to interpreting the anomalous information to identify and diagnose an issue, or a potential issue, in an electrical grid.

BACKGROUND

An increasing number of utilities are using advanced metering infrastructure ("AMI") meters, which allows a utility to remotely read and control meters. AMI meters are installed at each customer location, and the AMI meters provide a large amount of data, including customer usage for billing purposes, real-time or near-real-time voltage readings, and information regarding the status and operability of the AMI meter itself. Using traditional electricity meters (i.e., not AMI meters), utilities typically receive a single monthly reading for each meter within the provider's service network. Using AMI meters, a utility receives multiple voltage readings per day from each AMI meter, in addition to information regarding electricity usage the status and operability of the AMI meter.

Typically, information is sent from an AMI meter to a central location of the utility. Generally, separate databases are maintained for, e.g., billing, meter malfunctions, network malfunctions, and communications issues. Under some circumstances, all information received from AMI meters may be stored in a single database. "AMI Exception" or "Exception" may be used to refer to anomalous data existing in the data stored in these databases. For example, and not limitation, an Exception may refer to demand reset issues, fatal meter malfunction alarms, soft meter malfunction alarms, excessive meter malfunction alarms, meters that are not reporting to the utility, and meters that have missed a billing or electricity usage reading. Due to the massive amount of information provided by the AMI meters, identifying, diagnosing, and resolving Exceptions can prove costly in terms of resources and money for an electrical utility.

Moreover, it is possible that the data associated with a particular meter may include multiple Exceptions that each stem from a related root cause. Under circumstances where separate databases for each type of Exception are maintained, it is possible that an Exception in one database (e.g., a billing database) and an Exception in another database (e.g., a voltage readings database) may stem from the same root cause, but these Exceptions may each individually result in the generation of separate work orders to inspect and/or repair the potential malfunction. Stated otherwise, multiple Exceptions for a particular meter may result in the generation of redundant work orders directed to resolve a common root cause. To compound the problem, electricity utilities generally employ multiple types of technicians, who possess different skill levels and are outfitted with different tools. Utilities frequently assign particular tasks to a given technician depending on the issue that requires attention and the type of technician. Thus, it is possible that the redundant work orders for the common root cause may be forwarded to separate types of technician. This generally results in at least one technician unnecessarily traveling to a location in the field to investigate or resolve an issue that has already been corrected. Thus, additional cost associated with the technician's time and travel expenses are incurred by the utility.

Therefore, there is a desire for a method and system to identify and diagnose an issue in an electrical grid without manually inspecting individual meters. There is a further desire for a method and system to identify and diagnose an issue in an electrical grid prior to its occurrence such that the issue may be repaired prior to causing a power loss to customers. Various embodiments of the present disclosure address these desires.

SUMMARY

The present disclosure relates to managing and diagnosing root causes of anomalous data provided by AMI meters. An example embodiment of the present disclosure provides a method for diagnosing issues in an electricity service network. The method may include receiving, from each of a plurality of meters, raw meter data, and identifying anomalous data that exists in the raw meter data. Anomalous data may be indicative of raw meter data that is outside of a predetermined range of acceptable values. The method may also include comparing the anomalous data to a root cause database that includes known root causes and anomalous data associated with the known root causes. For anomalous data that has a known root cause, the method may include generating a work order, and for anomalous data that does not have a known root cause, the method may include submitting a first request for a manual review of the anomalous data. The method may also include receiving input indicating findings of the manual review and adding the findings of the manual review to the root cause database.

In some embodiments, the raw meter data can include billing data indicative of electrical usage measured by a meter, communication data indicative of the meter's communication ability, voltage data indicative of voltage levels measures by the meter, and meter malfunction data indicative of the meter's functionality.

In some embodiments, anomalous data can include at least one of: billing data that falls outside of a predetermined range of acceptable billing values, communication data that falls outside of a predetermined range of acceptable communication values, voltage data that falls outside of a predetermined range of acceptable voltage values, and meter malfunction data that falls outside of a predetermined range of acceptable meter malfunction values.

In certain embodiments, the method may also include removing duplicate work orders directed to a common meter and to a common root cause and/or corrective action.

In some embodiments, the method may also include determining, based at least in part on the findings of the manual review, a range of values such that anomalous data falling within the range of values is indicative of a potential root cause. The method may also include calculating a likelihood that future anomalous data that falls within the range of values is indicative of the potential root cause and updating, if the likelihood exceeds a predetermined threshold, the root cause database to include the potential root cause and the range of values.

In certain embodiments, the method may also include tracking an elapsed time since the first request for manual review was submitted and generating, if input indicating the findings of the manual review has not been received and the elapsed time exceeds a predetermined time limit, a second request for manual review of the unresolved exceptions for which input indicative of a discovered root cause has not been received.

An example embodiment of the present disclosure provides a method including receiving, from each of a plurality of meters, raw meter information. The raw meter information can include identity information of a meter, billing information indicative of electrical usage measured by the meter, communication information indicative of the meter's communication capability, voltage information indicative of voltage levels measures by the meter, and meter malfunction information indicative of the meter's functionality. The method can also include storing the raw meter information received from each of the plurality of meters in a first database and identifying exceptions that exist in the plurality of databases. An exception may be indicative of raw meter information that is outside of a predetermined range of acceptable values. The method can also include comparing the exceptions to a root cause database, which can include root cause information that correlates raw meter information with known root causes of exceptions. The method can also include determining whether the exceptions have a corresponding known root cause. Exceptions having a known root cause can be designated as identified exceptions and exceptions not having a known root cause can be designated as unidentified exceptions. The method can also include removing duplicate root causes for each of the plurality of meters. A duplicate root cause may be indicative of a meter having a plurality of identified exceptions that have a common known root cause. The method can also include generating a work order, which can identify the known root causes and the associated meters. The method can also include requesting a manual review of the unidentified exceptions and receiving input indicative of findings of the manual review of one of the unidentified exceptions. The findings may be indicative of a discovered root cause for the one of the unidentified exception. The method can also include determining, based at least in part on the findings of the manual review, a range of values such that a future exception falling within the range of values is indicative of a potential root cause, calculating a likelihood that the future exception will be caused by the potential root cause, and updating, if the likelihood exceeds a predetermined threshold, the root cause database to include the potential root cause and the range of values.

In certain embodiments, the method can also include a second database such that at least some of the raw meter information is stored in the first database and at least some of the raw meter information is stored in the second database.

In certain embodiments, the method can also include tracking an elapsed time since the first request for manual review was submitted and generating, if input indicating the findings of the manual review has not been received and the elapsed time exceeds a predetermined time limit, a second request for manual review of the unresolved exceptions for which input indicative of a discovered root cause has not been received.

An example embodiment of the present disclosure provides a system that includes a processor and a non-transitory computer-readable medium that stores instructions. When executed by a processor of a computing device, the instructions may cause the processor to receive, from each of a plurality of meters, raw meter data and identify anomalous data that exists in the raw meter data. Anomalous data can be indicative of raw meter data that is outside of a predetermined range of acceptable values. The instructions may further cause the processor to compare the anomalous data to a root cause database, which can include known root causes and anomalous data associated with the known root causes. For anomalous data that has a known root cause, the instructions may further cause the processor to generate a work order, and for anomalous data that does not have a known root cause, the instructions may further cause the processor to submit a first request for a manual review of the anomalous data. The instructions may further cause the processor to receive input indicating findings of the manual review and add the findings of the manual review to the root cause database.

In some embodiments, the raw meter data can include billing data indicative of electrical usage measured by a meter, communication data indicative of the meter's communication ability, voltage data indicative of voltage levels measures by the meter, and meter malfunction data indicative of the meter's functionality.

In certain embodiments, anomalous data can include at least one of: billing data that falls outside of a predetermined range of acceptable billing values, communication data that falls outside of a predetermined range of acceptable communication values, voltage data that falls outside of a predetermined range of acceptable voltage values, and meter malfunction data that falls outside of a predetermined range of acceptable meter malfunction values.

In some embodiments, the instructions may further cause the processor to remove duplicate work orders directed to a common meter and to a common root cause and/or corrective action.

In some embodiments, the instructions may further cause the processor to determine, based at least in part on the findings of the manual review, a range of values such that anomalous data falling within the range of values is indicative of a potential root cause, calculate a likelihood that future anomalous data that falls within the range of values is indicative of the potential root cause, and update, if the likelihood exceeds a predetermined threshold, the root cause database to include the potential root cause and the range of values.

In certain embodiments, the instructions may further cause the processor to track an elapsed time since the first request for manual review was submitted and generate, if input indicating the findings of the manual review has not been received and the elapsed time exceeds a predetermined time limit, a second request for manual review of the unresolved exceptions for which input indicative of a discovered root cause has not been received.

These and other aspects of the present disclosure are described in the Detailed Description below and the accompanying figures. Other aspects and features of embodiments of the present disclosure will become apparent to those of ordinary skill in the art upon reviewing the following description of specific, example embodiments of the present disclosure in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the disclosure discussed herein. In similar fashion, while example embodiments may be discussed below as device, system, or method embodiments, it is to be understood that such example embodiments can be implemented in various devices, systems, and methods of the present disclosure.

BRIEF DESCRIPTION OF THE DRAWINGS

The following Detailed Description is better understood when read in conjunction with the appended drawings. For the purposes of illustration, there is shown in the drawings example embodiments, but the subject matter is not limited to the specific elements and instrumentalities disclosed.

FIG. 8 provides a portion of a graphical user interface of a system indicating work orders generated for a meter, in accordance with embodiments of the present disclosure.

FIG. 9 provides a report summarizing Exceptions, in accordance with embodiments of the present disclosure.

FIG. 10 provides a report summarizing Network Exceptions by geographic area, in accordance with embodiments of the present disclosure.

DETAILED DESCRIPTION

Figure 1:
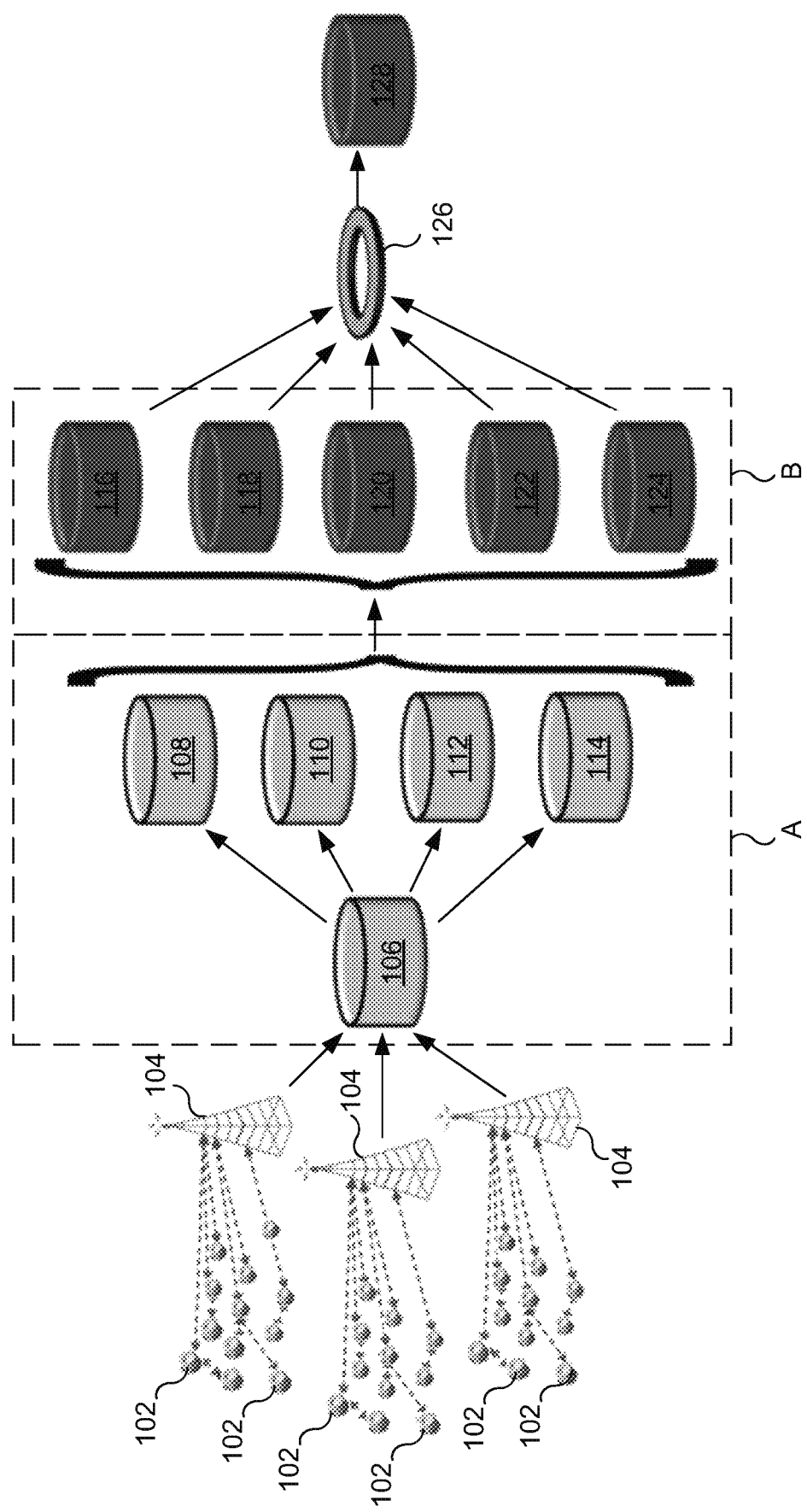
FIG. 1 provides a diagram illustrating a system configured to diagnose issues in an electrical grid, in accordance with embodiments of the present disclosure.

To facilitate an understanding of the principles and features of the present disclosure, various illustrative embodiments are explained below. To simplify and clarify explanation, the disclosed technology are described below as applied to identifying anomalous AMI meter data and diagnosing a root cause associated with the anomalous data. One skilled in the art will recognize, however, that the disclosed technology is not so limited.

The components, steps, and materials described hereinafter as making up various elements of the disclosed technology are intended to be illustrative and not restrictive. Many suitable components, steps, and materials that would perform the same or similar functions as the components, steps, and materials described herein are intended to be embraced within the scope of the disclosed technology. Such other components, steps, and materials not described herein can include, but are not limited to, similar components or steps that are developed after development of the disclosed technology.

Electrical utilities maintain electrical grids that commonly include millions of meters. Depending on the frequency with which each meter is programmed to transmit the values it has recorded, electrical utilities can be inundated with hundreds of millions of data points per week. Properly interpreted, these data points can be used to identify root causes of failures (e.g., malfunctioning individual electrical devices) in the electrical grid that require corrective maintenance or are nearing failure and require preventative maintenance. Therefore, electrical utilities would benefit from a method or system that can receive and evaluate a large amount of raw meter data, identify any anomalous data existing in the raw data, and accurately diagnose any issues associated with any anomalous data such that corrective or preventative maintenance may be completed. Further, such a method or system would benefit customers of electrical utilities decreasing the likelihood that a customer would incur a power loss.

Some embodiments of the disclosed technology include novel techniques for managing raw data from meters to identify anomalous data and determine a root cause associated with the anomalous data. Referring to the framework depicted in FIG. 1, according to some embodiments, a network of meters 102 can each measure, record, and transmit raw data associated with an electrical grid. This raw data can include billing data, communications data, meter malfunction data, and voltage data. Billing data may include electricity usage by a customer and whether a meter transmitted billing data for a given billing period. Communications data may include communication between a meter and another meter, communication between a meter and the electrical utility, and communication between a meter and another piece of equipment within the electrical grid. Meter malfunction data may include information relating to different levels of alarms generated by an alarm. For instance, if a meter detects that it or some aspect of the electrical grid is malfunctioning, the meter may transmit an alarm to the electrical utility. This alarm may be, for example, a fatal alarm that is indicative of a malfunction or error that is highly detrimental to one or more customers, to the public, or to the electrical grid. Alternatively, this alarm may be, for example, a soft alarm, which may serve as a reminder to engage in preventative maintenance or may be indicative of a potential malfunction or a malfunction that presents a low level of impairment to one or more customers or the electrical grid (e.g., a malfunction that decreases the efficiency of a given process but is unlikely to interrupt a customer's electricity service or otherwise present issues to the electrical utility or a customer). Voltage data may include a maximum voltage, a minimum voltage, and an average voltage that the meter measured over a predetermined measuring period.

Referring to FIG. 1, the meters 102 may transmit raw data via any acceptable communication system 104 to a central location of the electrical utility. Some embodiments may use one or more wired communication systems 104 to transmit the raw data; some embodiments may use one or more wireless communication systems 104 to transmit the raw data. In certain embodiments, the electrical utility can verify the data by reviewing and formatting the data to a desired format and can store the raw data in at least one database. In some embodiments, as shown in box A of FIG. 1, the received raw data can be stored in a Raw Data Database 106, and the raw data can then be split by type of data (e.g., billing data, communications data, meter malfunction data, voltage data) and can be stored in its respective database, such as Billing Data Database 108, Communications Data Database 110, Meter Malfunction Database 112, and Voltage Database 114. In some embodiments, all raw data can be stored in a single database (i.e., box A would include only Raw Data Database 106). In other embodiments, the raw data can be split by type of data prior to being saved and stored directly in separate databases according to type of data (i.e., box A would not include Raw Data Database 106).

According to certain embodiments, identification of Exceptions (i.e., anomalous data) existing in the raw data may made. An Exception may refer to raw data indicative of values that are outside of a predetermined range. For example, a Voltage Exception may occur if a voltage level measured by a meter is outside of a predetermined range of acceptable levels. A Billing Exception may occur if a meter fails to report billing information by a predetermined reporting deadline, which can be any desired deadline, such as a predetermined time each week, each, day, each hour, particular pricing time periods (e.g., On Peak, Off Peak, Shoulder), and the like. A Meter Malfunction Exception may occur if a meter transmits a fatal alarm, a soft alarm, or excessive alarms. Excessive alarms may refer to the number of alarm transmissions from a particular meter exceeding a predetermined threshold. Some meters can be configured to record the high peak demand interval during a predetermined period of time. In certain embodiments, a Meter Malfunction may occur if a meter fails to read or reset the measured high peak demand interval during the predetermined period of time. In some embodiments, a Meter Malfunction may occur if a meter measures and/or reports energy consumption values that are outside of a predetermined range of acceptable values or if the energy usage consumption pattern exhibits an unusual pattern, such as one or more irregular spikes in consumption over time. A Communication Exception may occur if the raw data indicates that a meter is unable to communicate wither another meter, with the electrical utility, or with another piece of equipment within the electrical grid. A Network Exception may occur if the number of meters failing to properly communicate or failing to report billing information exceeds a predetermined threshold; in some embodiments, it may also be required for the number of meters that exceed the predetermined threshold to be local to one another, such as being geographically located within a predetermined distance of one another. In some embodiments, a Network Exception may occur if a meter has not communicated with the electrical utility in more than a predetermined amount of time. For example, in some embodiments, a Network Exception may occur if a meter has failed to communicate with the electrical utility in a 96-hour period. A 96-hour period is merely a single example; any other predetermined amount of time may be sufficient to trigger a Network Exception. In some embodiments, the Exceptions can be stored in separate databases according to data type such that, for example, Voltage Exceptions can be stored in a Voltage Exceptions Database 116, Billing Exceptions can be stored in a Billings Exceptions Database 118, Meter Malfunction Exceptions can be stored in a Meter Malfunction Exception Database 120, Communication Exceptions can be stored in a Communication Exception Database 122, Network Exceptions can be stored in a Network Exception Database 124, as shown in box B of FIG. 1. In some embodiments, all Exceptions can be stored in a single Exceptions Database (i.e., box B would include only a single database, which would store all Exceptions).

In some embodiments, the Exceptions may then be compared to a Root Cause Database 126 comprising various ranges of raw data values that are predetermined to indicate various root causes. For example, the failure of a group of closely located meters to communicate with the electrical utility may indicate a broken conductor in the electrical grid. As another non-limiting example, a particular meter may fail to transmit billing information, which may be indicative of a Billing Exception. An Exception with raw data values that fall within, or sufficiently mimic, the ranges of raw data values in the Root Cause Database 126 may indicate that that Exception has an identified root cause; in such a case, the Exception may be referred to as an Identified Exception. Alternately, an Exception with raw data values that do not fall within, or sufficiently mimic, the ranges of raw data in the Root Cause Database 126 may indicate that that Exception does not have an identified root cause and instead has an unidentified root cause; in such a case, the Exception may be referred to as an Unidentified Exception.

In some embodiments, a system, module, or any acceptable tool 128 may generate a work order for the meter associated with an Identified Exception (i.e., an Exception that has an identified root cause). In some embodiments, duplicate work orders associated with the same meter and directed to the same root cause and/or the same corrective action can be removed. In certain embodiments, this removal of duplicate work orders may occur after the work orders are generated. In some embodiments, Exceptions that are associated with the same meter and that are associated with the same identified root cause and/or the same corrective action can be effectively merged prior to a work order being generated. Regardless of the timing, in some embodiments, a maximum of one work order per meter per root cause may be generated.

In certain embodiments, a manual review of each Unidentified Exception (i.e., an Exception that does not have a known root cause) can be requested. In some embodiments, input indicating a corrective action that remedied a particular Unidentified Exception can be received. The corrective action and associated Exception values can then, in some embodiments, be saved to a Possible Root Cause Database. This process of tracking corrective actions made to fix Unidentified Exceptions via the Possible Root Cause Database can be repeated for each Unidentified Exception that has been successfully remedied.

In some embodiments, a corrective action, or a group of the same or similar corrective actions, can be associated with a root cause. In some embodiments, Unidentified Exceptions having the same or similar values or qualities and receiving the same corrective action can be relied on to calculate the statistical probability that future Exceptions having the same or similar value or qualities will be associated with the same root cause. In certain embodiments, upon exceeding a predetermined statistical threshold, an Unidentified Exception can be deemed an Identified Exception, and this new Identified Exception and the associated root cause can be added to the Root Cause Database 126. Thus, it is possible for future Exceptions having the same or similar values or qualities as this newly added Identified Exception to be recognized as Identified Exceptions, which can result in work orders being generated for the meters associated with these future Identified Exceptions.

Figure 2:
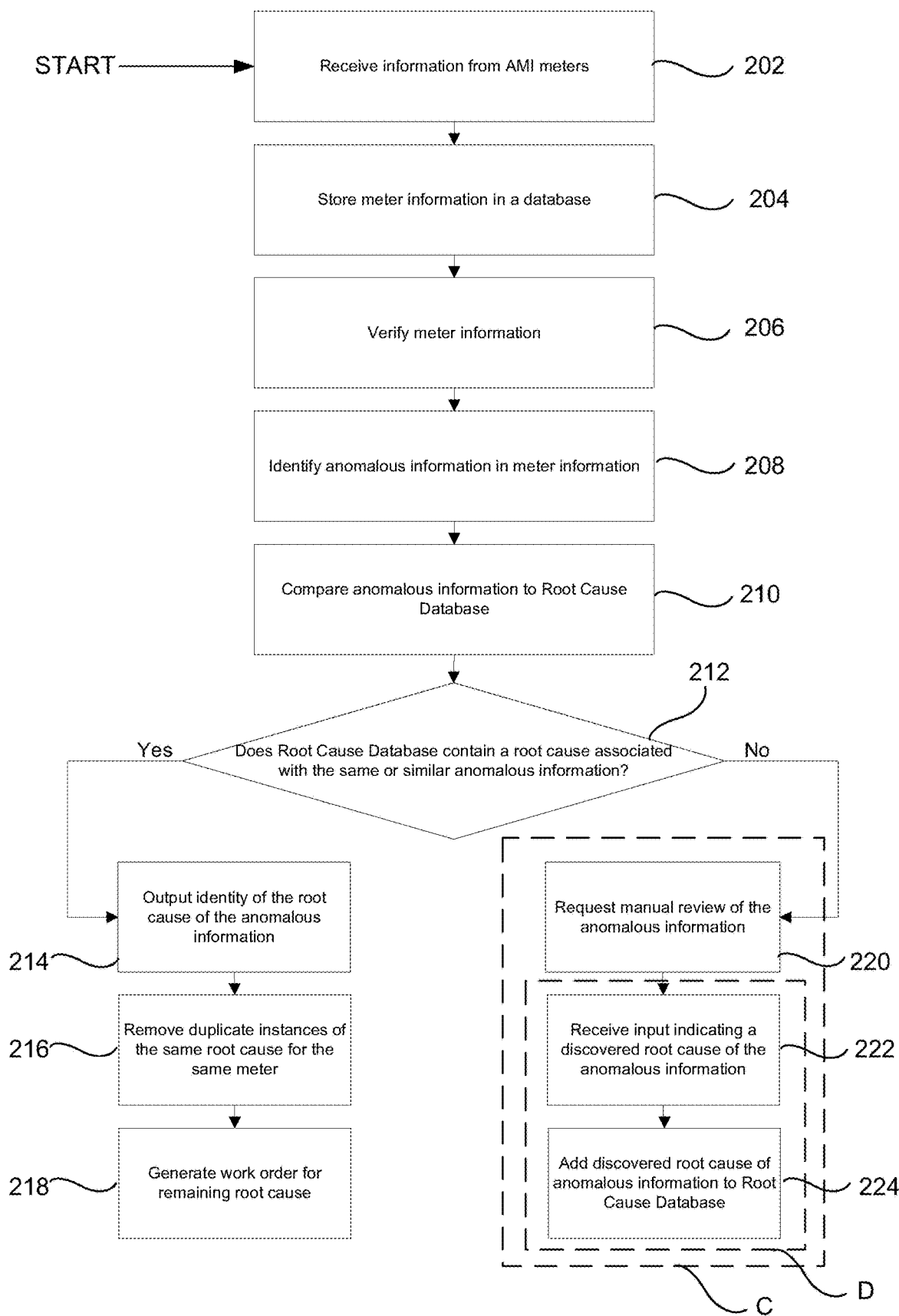
FIG. 2 provides a flowchart illustrating a method of diagnosing issues in an electrical grid based on data from an AMI meter, in accordance with embodiments of the present disclosure.

FIG. 2 illustrates a method in accordance in accordance with some embodiments of the present disclosure. In some embodiments, information from a plurality of meters 102 may be received 202. The meter information may be stored 204 in a database (e.g., Raw Data Database 106) and may be verified 206. Verifying the meter information may include verifying that the correct type of data was received from some or all of the meters and may include some or all of the following processes: ensuring that all fields that should include information do include information, ensuring that fields that should not include information do not include information, ensuring that each field that should include information includes information of the correct type, and ensuring that the format of some or all fields is correct. As discussed above, anomalous information in the meter information (i.e., Exceptions) may be identified 208. The anomalous information (i.e., Exceptions) may then be compared 210 to the Root Cause Database 126.

One of two operations may subsequently be followed, depending on whether 212 the Root Cause Database 126 contains a root cause associated with the same, or sufficiently similar, anomalous information. If the Root Cause Database 126 contains a root cause that can be associated with the anomalous information, the identity of the root cause of the anomalous information can be outputted 214. In some embodiments, duplicate instances of the same root cause for the same meter may be removed 216, as discussed above. A work order instructing a technician to fix the root cause may then be generated 218.

If the Root Cause Database 126 fails to include a root cause associated with the anomalous information, manual review of the anomalous information can be requested 220. In some embodiments, input indicating a discovered root cause of the anomalous information and/or a corrective action taken to remedy the problem or issue that caused the anomalous information may be received 222. Certain embodiments may then add 224 the discovered root cause and/or corrective action to the Root Cause Database 126.

Figure 3:
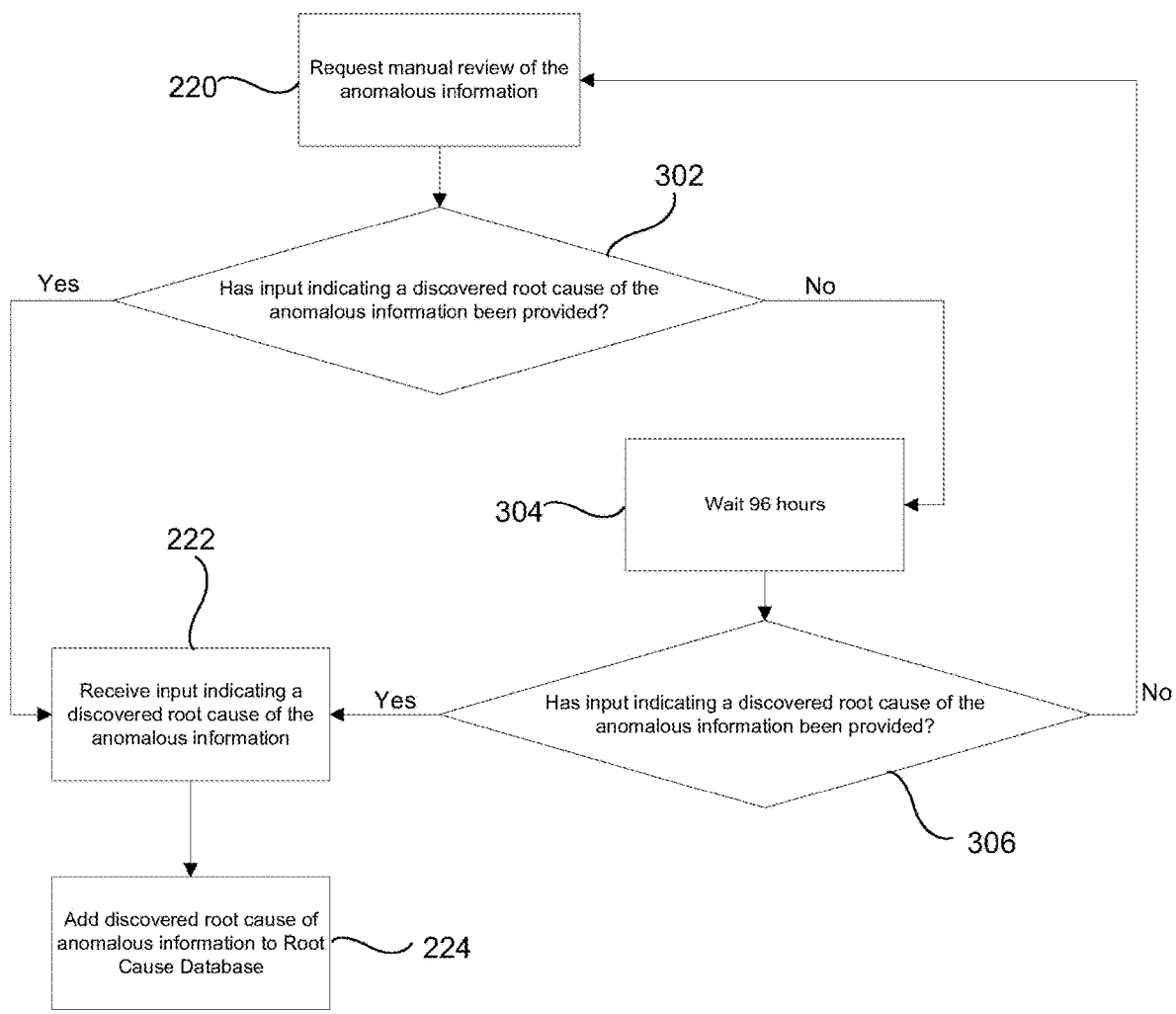
FIG. 3 provides a flowchart illustrating a sub-process in a method of diagnosing issues in an electrical grid based on data from an AMI meter, in accordance with embodiments of the present disclosure.

Some embodiments may include steps different from those in box C of FIG. 2. One such embodiment is illustrated in FIG. 3. Manual review of the anomalous information can be requested 220, after which inquiry can be made as to whether 302 input indicating a discovered root cause and/or a remedying corrective action has been provided. If yes, input indicating a discovered root cause of the anomalous information and/or a corrective action taken to remedy the problem or issue that caused the anomalous information may be received 222, and the discovered root cause and/or corrective action may be added 224 to the Root Cause Database 126. If, however, no input has been provided, certain embodiments may wait 304 for a predetermined waiting period, such as 96 hours. As discussed above, any acceptable or sufficient period of time is herein contemplated. After the predetermined waiting period has expired, another inquiry can be made as to whether 302 input indicating a discovered root cause and/or a remedying corrective action has been provided. If yes, input indicating a discovered root cause of the anomalous information and/or a corrective action taken to remedy the problem or issue that caused the anomalous information may be received 222, and the discovered root cause and/or corrective action may be added 224 to the Root Cause Database 126. If no, manual review of the anomalous information can be again requested 220, starting the process of FIG. 3 anew.

Figure 4:
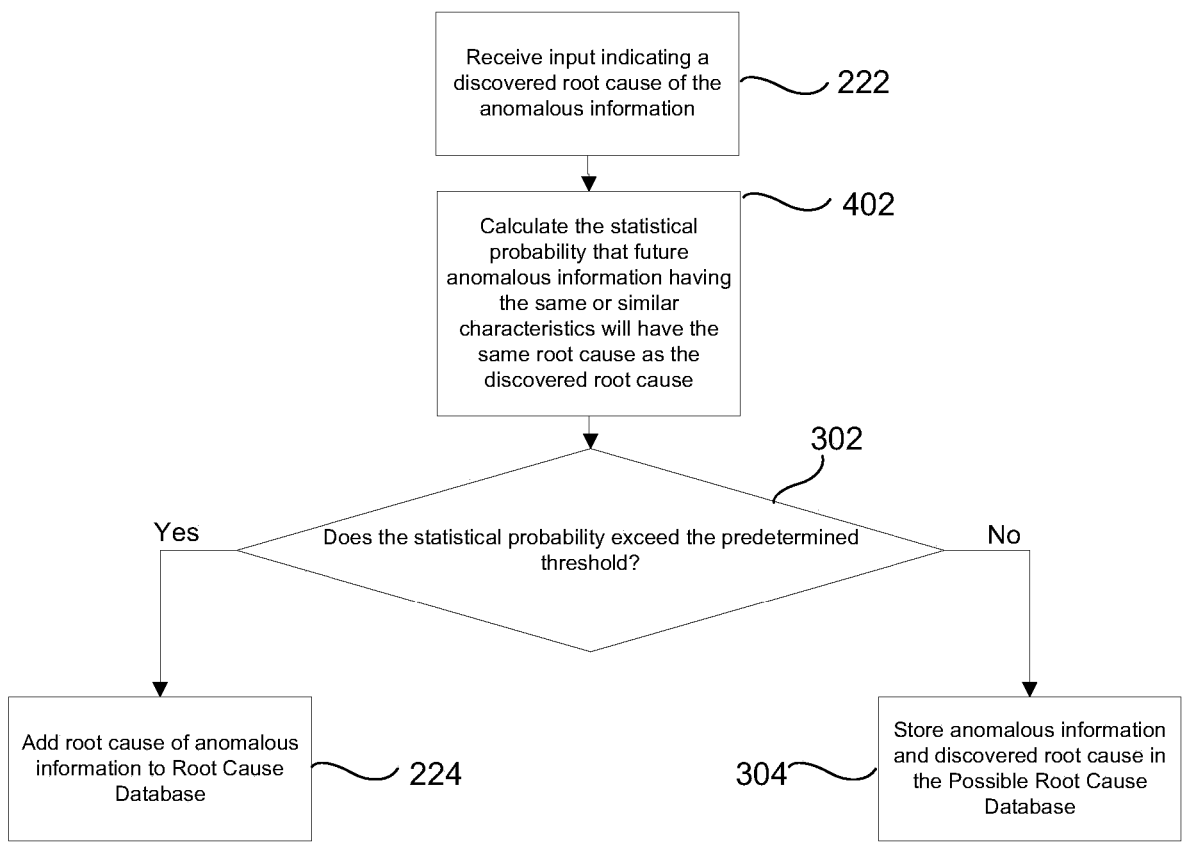
FIG. 4 provides a flowchart illustrating a sub-process in a method of diagnosing issues in an electrical grid based on data from an AMI meter, in accordance with embodiments of the present disclosure.

Some embodiments may include steps different from those in box D of FIG. 2, such as the embodiment illustrated in FIG. 4. Certain embodiments may receive 222 input indicating a discovered root cause of the anomalous information and/or a corrective action taken to remedy the problem or issue that caused the anomalous information. The statistical probability that future anomalous information having the same characteristics, or sufficiently similar characteristics, will have the same root cause as the discovered root cause may then be calculated 402. Such a calculation may rely on the anomalous information and/or data stored in the Possible Root Cause Database. An inquiry may then be made as to whether 302 the statistical probability exceeds a predetermined threshold. If the statistical probability does exceed the predetermined threshold, certain embodiments can then add the discovered root cause of the anomalous information to the Root Cause Database 126. If the statistical probability does not exceed the predetermined threshold, some embodiments may store the anomalous information and the corresponding discovered root cause and/or corrective action in the Possible Root Cause Database.

According to some embodiments, a system is provided, which includes a processor and a non-transitory computer readable medium that stores instructions. In some embodiments, this system is software saved in memory on a computer. In some embodiments, this system is saved on a physical disk or other medium. These instructions, when executed by a processor of a computer or other computing device, may cause the processor to receive raw meter data from a plurality of AMI meters in an electrical grid and store the raw meter data in one or more databases. These instructions may also verify the raw meter data and identify Exceptions (i.e., anomalous data in the raw meter data). These instructions may also identify a root cause for each of the Exceptions, if the root cause is known, and may generate a work order for the root causes. In some embodiments, the instructions can remove duplicate root causes for the same meter such that a single work order per root cause per meter is generated.

If a root cause of the Exceptions is not known, the instructions may request manual review of the Exceptions and receive input indicating a discovered root cause of one or more of the Exceptions. The instruction may also add the discovered root cause of one or more of the Exceptions to a Root Cause Database. The instructions may also wait for a predetermined waiting period and, after the predetermined waiting period has expired, may re-request manual review of a particular Exception if input has not yet been provided to the system.

The instructions may receive this input may calculate the statistical probability that a future Exception having the same, or sufficiently similar, characteristics will have the same root cause the discovered root cause. If a predetermined threshold of statistical probability is exceeded, the instructions may add the discovered root cause of the Exception to the Root Cause Database. If the predetermined threshold is not exceeded, the instructions may store the Exception and the discovered root cause and/or corrective action in the Possible Root Cause Database.

Figures 5, 6, 7:
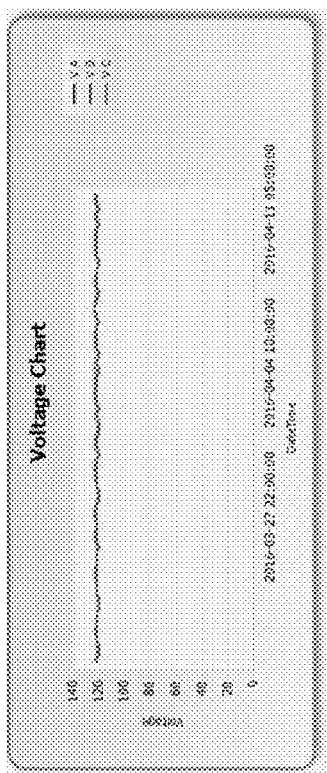
FIG. 5 provides a portion of a graphical user interface of a system illustrating voltage levels of a meter, in accordance with embodiments of the present disclosure.
FIG. 6 provides a portion of a graphical user interface of a system indicating an alarm history of a meter, in accordance with embodiments of the present disclosure.
FIG. 7 provides a portion of a graphical user interface of a system indicating Exceptions of a meter, in accordance with embodiments of the present disclosure.
Figure 8:
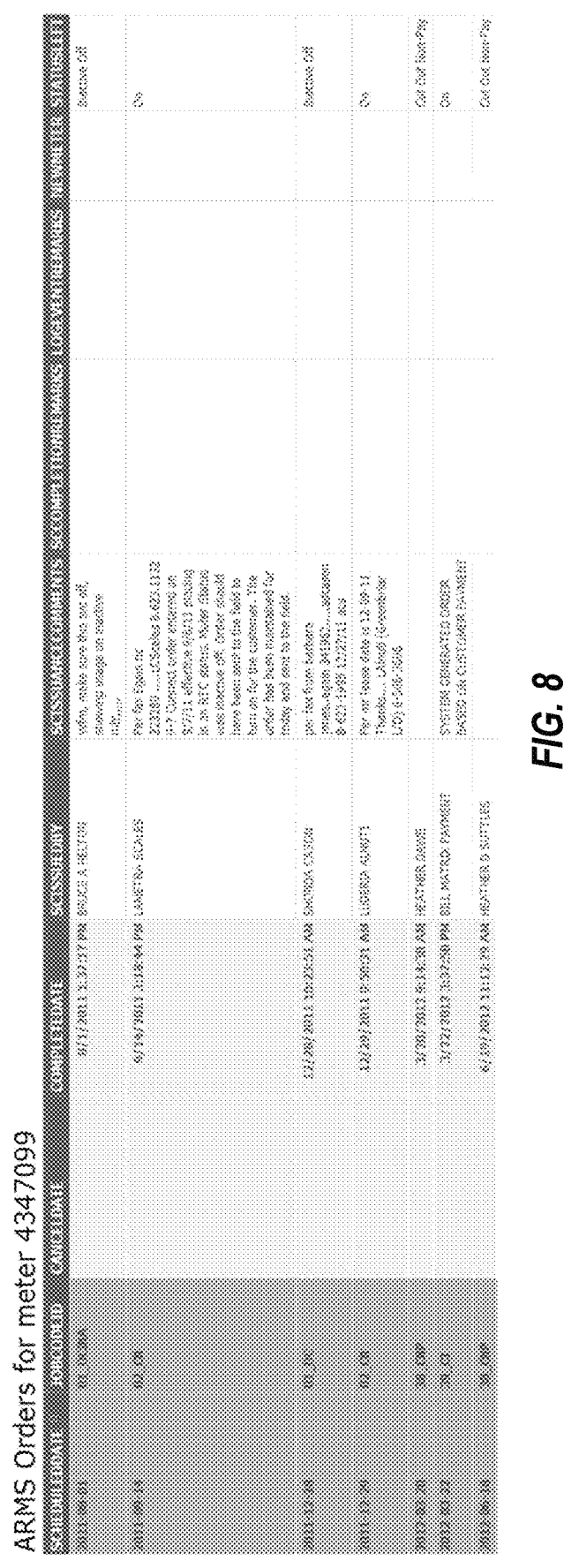

In some embodiments, a graphical depiction of readings received from a particular meter is displayed via the display. This displayed information may relate to the raw data of a meter or to the different types of data reported by a meter (e.g., billing data, meter malfunction data, communication data, voltage data). For example, as shown in FIG. 5, in some embodiments, the graphical depiction may include voltage information reported by a meter. In some embodiments, the displayed information may relate to various Exceptions related to a particular meter, a subset of the plurality of meters, or the entire network of meters. For example, some embodiments may show a list of previous alarms for a particular meter, as shown in FIG. 6 and some embodiments may show a list of all Exceptions for a particular meter, as shown in FIG. 7. As shown in FIG. 8, some embodiments may show a history of work orders for a particular meter. A history of work orders may also be shown for a subset of the plurality of meters or the entire network of meters.

Figure 9:
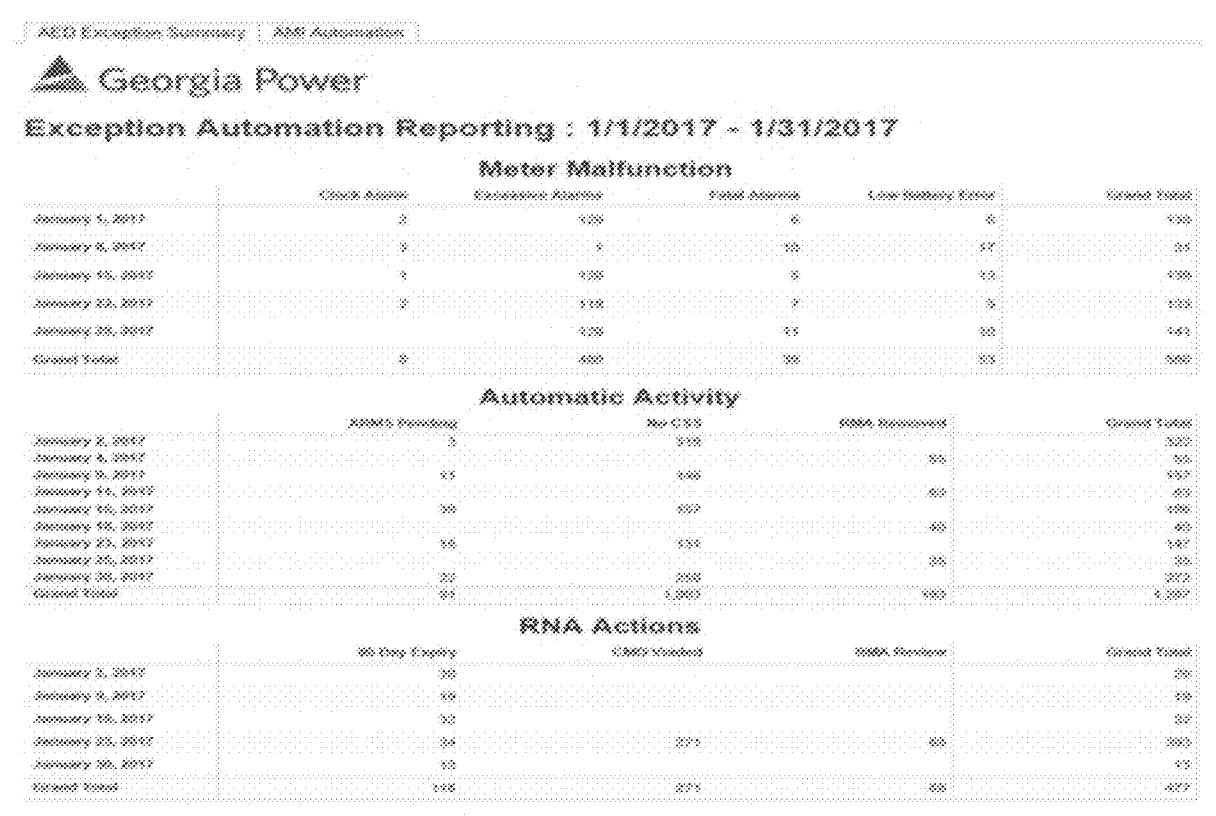
Figure 10:
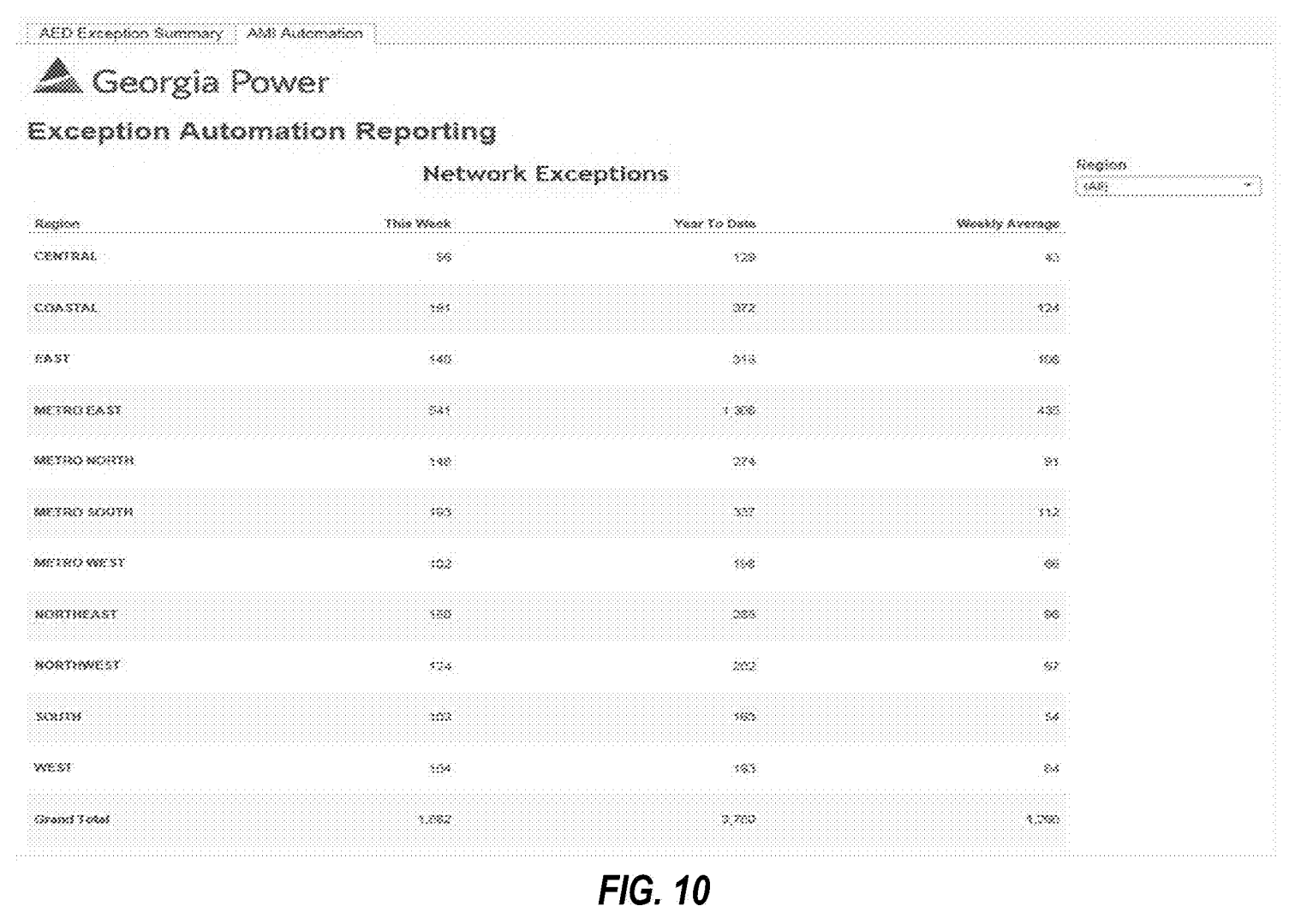

In some embodiments, the system may be configured to provide daily reports summarizing Exceptions, work orders, root causes, manual review requests, and other pertinent information for a particular meter, a subset of the plurality of meters, or the entire network of meters. In some embodiments, reports can be provided more frequently; in some embodiments, updates can be provided less frequently. For example, as shown in FIG. 9, a report summarizing the number of Exceptions for a group of meters over a month may be provided by the system. Reports directed to a particular type of Exception may be provided by the system. For example, as shown in FIG. 10, the system may provide a report summarizing the number of Network Exceptions by geographic area.

In some embodiments, the system may be configured to operative in conjunction with existing software and services commonly used by electrical utilities. These software and services may include Microsoft SQL Server, MicrosoftSQL Server Integration Services, Microsoft SQL Server Reporting Services (SSRS), AMI, Microsoft .NET, Microsoft Visual Studio, and Tableau.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the disclosed technology is defined by the claims appended hereto.

What is claimed is:

1. A method for diagnosing issues in an electricity service network comprising:
    receiving, from each of a plurality of meters, raw meter data;
    identifying anomalous data that exists in the raw meter data, wherein anomalous data is indicative of raw meter data that is outside of a predetermined range of acceptable values;
    comparing the anomalous data to a root cause database, the root cause database comprising known root causes and anomalous data associated with the known root causes;
    for anomalous data that has a known root cause, generating a work order;
    for anomalous data that does not have a known root cause, submitting a first request for a manual review of the anomalous data;
    receiving input indicating findings of the manual review; and
    adding the findings of the manual review to the root cause database.

2. The method of claim 1, wherein the raw meter data comprises:
    billing data indicative of electrical usage measured by a meter;
    communication data indicative of the meter's communication ability;
    voltage data indicative of voltage levels measures by the meter; and
    meter malfunction data indicative of the meter's functionality.

3. The method of claim 1, wherein anomalous data comprises at least one of:
    billing data that falls outside of a predetermined range of acceptable billing values;
    communication data that falls outside of a predetermined range of acceptable communication values;
    voltage data that falls outside of a predetermined range of acceptable voltage values; and
    meter malfunction data that falls outside of a predetermined range of acceptable meter malfunction values.

4. The method of claim 1 further comprising:
    removing duplicate work orders directed to a common meter and to a common root cause and/or corrective action.

5. The method of claim 1 further comprising:
    determining, based at least in part on the findings of the manual review, a range of values such that anomalous data falling within the range of values is indicative of a potential root cause;
    calculating a likelihood that future anomalous data that falls within the range of values is indicative of the potential root cause; and
    updating, if the likelihood exceeds a predetermined threshold, the root cause database to include the potential root cause and the range of values.

6. The method of claim 1 further comprising:
    tracking an elapsed time since the first request for manual review was submitted; and
    generating, if input indicating the findings of the manual review has not been received and the elapsed time exceeds a predetermined time limit, a second request for manual review of the unresolved exceptions for which input indicative of a discovered root cause has not been received.

7. A method for diagnosing issues in an electricity service network comprising:
    receiving, from each of a plurality of meters, raw meter information including:
        identity information of a meter;
        billing information indicative of electrical usage measured by the meter;
        communication information indicative of the meter's communication capability;

voltage information indicative of voltage levels measures by the meter; and meter malfunction information indicative of the meter's functionality;

storing the raw meter information received from each of the plurality of meters in a first database;

identifying exceptions that exist in the plurality of databases, wherein an exception is indicative of raw meter information that is outside of a predetermined range of acceptable values;

comparing the exceptions to a root cause database, the root cause database comprising root cause information that correlates raw meter information with known root causes of exceptions;

determining whether the exceptions have a corresponding known root cause, wherein exceptions having a known root cause are designated as identified exceptions and exceptions not having a known root cause are designated as unidentified exceptions;

removing duplicate root causes for each of the plurality of meters, wherein a duplicate root cause is indicative of a meter having a plurality of identified exceptions that have a common known root cause;

generating a work order, the work order identifying the known root causes and the associated meters;

requesting a manual review of the unidentified exceptions;

receiving input indicative of findings of the manual review of one of the unidentified exceptions, the findings indicative of a discovered root cause for the one of the unidentified exception;

determining, based at least in part on the findings of the manual review, a range of values such that a future exception falling within the range of values is indicative of a potential root cause;

calculating a likelihood that the future exception will be caused by the potential root cause; and updating, if the likelihood exceeds a predetermined threshold, the root cause database to include the potential root cause and the range of values.

8. The method of claim 7 further comprising a second database, wherein at least some of the raw meter information is stored in the first database and at least some of the raw meter information is stored in the second database.

9. The method of claim 7 further comprising:
tracking an elapsed time since the first request for manual review was submitted; and generating, if input indicating the findings of the manual review has not been received and the elapsed time exceeds a predetermined time limit, a second request for manual review of the unresolved exceptions for which input indicative of a discovered root cause has not been received.

10. A non-transitory computer-readable medium that stores instructions that, when executed by a processor of a computing device, causes the computing device to perform a method comprising:

receiving, from each of a plurality of meters, raw meter data;

identifying anomalous data that exists in the raw meter data, wherein anomalous data is indicative of raw meter data that is outside of a predetermined range of acceptable values;

comparing the anomalous data to a root cause database, the root cause database comprising known root causes and anomalous data associated with the known root causes;

for anomalous data that has a known root cause, generating a work order;

for anomalous data that does not have a known root cause, submitting a first request for a manual review of the anomalous data;

receiving input indicating findings of the manual review; and adding the findings of the manual review to the root cause database.

11. The non-transitory computer-readable medium of claim 10, wherein the raw meter data comprises:

billing data indicative of electrical usage measured by a meter;

communication data indicative of the meter's communication ability;

voltage data indicative of voltage levels measures by the meter; and meter malfunction data indicative of the meter's functionality.

12. The non-transitory computer-readable medium of claim 10, wherein anomalous data comprises at least one of:

billing data that falls outside of a predetermined range of acceptable billing values;

communication data that falls outside of a predetermined range of acceptable communication values;

voltage data that falls outside of a predetermined range of acceptable voltage values; and meter malfunction data that falls outside of a predetermined range of acceptable meter malfunction values.

13. The non-transitory computer-readable medium of claim 10 further comprising instructions that, when executed by a processor of a mobile computing device, causes the mobile computing device to perform the additional step of:

removing duplicate work orders directed to a common meter and to a common root cause and/or corrective action.

14. The non-transitory computer-readable medium of claim 10 further comprising instructions that, when executed by a processor of a mobile computing device, causes the mobile computing device to perform the additional steps of:

determining, based at least in part on the findings of the manual review, a range of values such that anomalous data falling within the range of values is indicative of a potential root cause;

calculating a likelihood that future anomalous data that falls within the range of values is indicative of the potential root cause; and updating, if the likelihood exceeds a predetermined threshold, the root cause database to include the potential root cause and the range of values.

15. The non-transitory computer-readable medium of claim 10 further comprising instructions that, when executed by a processor of a mobile computing device, causes the mobile computing device to perform the additional steps of:

tracking an elapsed time since the first request for manual review was submitted; and generating, if input indicating the findings of the manual review has not been received and the elapsed time exceeds a predetermined time limit, a second request for manual review of the unresolved exceptions for which input indicative of a discovered root cause has not been received.

* * * * *